United States Patent
Willemain et al.

(10) Patent No.: US 9,338,734 B2
(45) Date of Patent: May 10, 2016

(54) METHOD FOR DISCOVERING NEIGHBOR CELLS IN A RADIO CELLULAR NETWORK

(71) Applicant: Alcatel Lucent, Boulogne Billancourt (FR)

(72) Inventors: Patrick Willemain, Nozay (FR); Marco Meinero, Nozay (FR); Frederic Deville, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 88 days.

(21) Appl. No.: 14/374,893

(22) PCT Filed: Jan. 21, 2013

(86) PCT No.: PCT/EP2013/051009
§ 371 (c)(1),
(2) Date: Jul. 25, 2014

(87) PCT Pub. No.: WO2013/113574
PCT Pub. Date: Aug. 8, 2013

(65) Prior Publication Data
US 2015/0017981 A1 Jan. 15, 2015

(30) Foreign Application Priority Data
Feb. 1, 2012 (EP) .................................... 12153498

(51) Int. Cl.
*H04W 4/00* (2009.01)
*H04W 36/00* (2009.01)
(Continued)

(52) U.S. Cl.
CPC .............. *H04W 48/16* (2013.01); *H04W 24/02* (2013.01); *H04W 24/10* (2013.01); *H04W 84/042* (2013.01)

(58) Field of Classification Search
CPC .................................................. H04W 24/10
USPC ....................................................... 455/434
See application file for complete search history.

(56) References Cited

U.S. PATENT DOCUMENTS 6,392,568 B1 * 5/2002 Cooper ............... H03M 7/3088
341/106
8,787,306 B2 * 7/2014 Balasubramanian H04J 11/0093
370/328
(Continued)

FOREIGN PATENT DOCUMENTS

JP          2011518531        6/2011
WO     WO 2011/150250 A1    12/2011

OTHER PUBLICATIONS

ZTE et al., "ANRF for UTRAN," $3^{rd}$ Generation Partnership Project (3GPP), 3GPP TSG RAN WG3 #69bis, R3-102739, pp. 1-7, XP050453470, Xian, China, Oct. 11-15, 2010.
(Continued)

*Primary Examiner* — Rafael Pérez-Gutiérrez
*Assistant Examiner* — Mark G. Pannell
(74) *Attorney, Agent, or Firm* — Fay Sharpe LLP

(57) ABSTRACT

The present invention relates to a method for discovering neighbor cells (NC) in a radio cellular network (NTW) comprising cells, each served by a controller (eNB), the method comprising, with respect to a controller (eNB) serving a cell (C): (a): selecting a frequency (f) in a frequency list, each frequency being associated with a priority (Prio), a target value (TV) and a counter (Count), and wherein said frequency (f) is selected in the frequency list according to its priority (Prio); (b): selecting a terminal (UE) located in the cell (C) and connected with the controller (eNB); (c): sending a control message to the selected terminal (UE), said control message comprising a request to perform radio measurements relating to neighbor cells (NC) of the cell (C), for the selected frequency (f); (d): incrementing the counter (Count) associated with the frequency (f); (e): if the counter (Count) is equal to the target value (TV) for the selected frequency (f), then deleting the selected frequency (f) from the frequency list; repeating steps (a), (b), (c), (d) and (e) during a predetermined time (Tc) or until the frequency list if empty.

9 Claims, 4 Drawing Sheets

(51) Int. Cl.
*H04W 48/16* (2009.01)
*H04W 24/02* (2009.01)
*H04W 24/10* (2009.01)
*H04W 84/04* (2009.01)

(56) References Cited

U.S. PATENT DOCUMENTS

| | | | | |
|---|---|---|---|---|
| 8,942,205 | B2* | 1/2015 | Mach | H04W 48/20 370/252 |
| 2005/0277416 | A1* | 12/2005 | Tolli | H04W 36/0094 455/436 |
| 2006/0183482 | A1* | 8/2006 | Ueda | H04W 36/0061 455/439 |
| 2007/0223599 | A1* | 9/2007 | Sheng | H04B 1/0003 375/259 |
| 2009/0191862 | A1 | 7/2009 | Amirijoo et al. | |
| 2009/0264130 | A1 | 10/2009 | Catovic et al. | |
| 2010/0029233 | A1* | 2/2010 | Chu | H04H 20/22 455/186.1 |
| 2010/0075675 | A1* | 3/2010 | Yang | H04W 36/0094 455/436 |
| 2010/0216468 | A1* | 8/2010 | Kazmi | H04W 48/20 455/435.3 |
| 2011/0034169 | A1* | 2/2011 | Roberts | H04W 48/18 455/435.3 |
| 2011/0110254 | A1* | 5/2011 | Ji | H04W 36/0066 370/252 |
| 2011/0237219 | A1* | 9/2011 | Mendenhall | H04M 1/72577 455/405 |
| 2012/0046066 | A1* | 2/2012 | Tamura | H04L 1/0029 455/525 |
| 2012/0190361 | A1* | 7/2012 | Shaikh | H04W 48/18 455/434 |
| 2013/0007039 | A1* | 1/2013 | Edara | H04W 48/16 707/769 |
| 2013/0017828 | A1* | 1/2013 | Weng | H04W 36/0083 455/434 |
| 2013/0084850 | A1* | 4/2013 | Martin | H04W 24/10 455/423 |
| 2013/0109372 | A1* | 5/2013 | Ekici | H04W 24/02 455/422.1 |
| 2013/0188499 | A1* | 7/2013 | Mach | H04W 48/20 372/252 |
| 2013/0223235 | A1* | 8/2013 | Hu | H04W 36/04 370/242 |
| 2014/0146794 | A1* | 5/2014 | Dalsgaard | H04W 8/02 370/332 |

OTHER PUBLICATIONS

International Search Report for PCT/EP2013/051009 dated Feb. 20, 2013.
LTE; Evolved Universal Terrestrial Radio Access (E-UTRA) and Evolved Universal Terrestrial Radio Access Network (E-UTRAN); Overall description; Stage 2, 3GPP TS 36.300 V10.6.0, Release 10, (Jan. 2012), pp. 1-208.

* cited by examiner

METHOD FOR DISCOVERING NEIGHBOR CELLS IN A RADIO CELLULAR NETWORK

FIELD OF THE INVENTION

The present invention relates to a method for discovering neighbor cells of a cell served by a controller in a radio cellular network.

BACKGROUND

Initially, configuration of a radio cellular network and elements of said network is determined manually by an operator and sent to a configuration entity. Then said configuration entity sends the determined configuration to each element of the network. It is to be noted that configuration is defined as radio parameters of controller of the network (for example emitted power, bandwidth used . . . ), and Neighbor Relations (NR) between cells of the network. Neighbor Relations are defined in the 3GPP standard 36.300 section 22.3.2a.

Manually managing neighbor relations in traditional radio cellular networks is a challenging task and becomes more difficult as new mobile technologies are being rolled out while 2G/3G cells already exist. For example, for LTE technology, task becomes challenging for operators, as in addition of defining intra LTE neighbor relations, the operator has to consider neighboring 2G, 3G, CDMA2000 cells as well.

Automatic Neighbor Relation (ANR) function as defined by the 3GPP aims to relieve the operator from the burden of manually managing neighbor relations. The ANR function is implemented in a controller of the network (a base station), and aims at automatically managing neighbor relations of each cell served by the controller. It consists for the controller on using terminals located in the cell for discovering neighbor cells.

Indeed, cells broadcast an identifying signature, named Physical Cell Identity (PCI), which terminals use to identify cells. These identifying signatures are not unique (there are 504 different PCIS in LTE), so cells broadcast an other identifying signature, named Cell Global Identifier (CGI), which can be detected and reported by terminals. Each cell has a unique CGI. However, detecting CGI is more difficult and time consuming comparing to detecting PCI, which implies restrictive use of CGIs detection. As a consequence, the controller manages a mapping between the PCI and the CGI. This enables a terminal to identify cells in measuring only the PCI.

The 3GPP standard defines several elementary steps for ANR function:
  The controller instructs terminals located in the cell and connected with the controller, to perform ANR measurements in the neighborhood of the cell.
  Each terminal sends a measurement report to the controller. This report contains PCIS, Tracking Area Codes (TACs), and all available operator codes (PLMN IDs) of detected neighbor cells.
  If the relation PCI-CGI is unknown at the controller, then the controller instructs the terminals to report the CGIs of the detected cells.
  The controller creates and exhibits a Neighbor Relation between the cell and every detected cell.

There are many neighbor cells on many frequencies to discover. Indeed, there are many LTE frequencies, and many cells for each frequency. Furthermore, the ANR function also applies to other Radio Access Technologies and there can exist many UTRAN and/or GERAN and/or CDMA2000 frequencies. Every neighbor cell of every technology has to be discovered.

As the terminals population used for the ANR function is a scarce resource compared to the number of different neighbor cells to discover, they should be used efficiently.

SUMMARY

It is an object of the invention to provide a method for discovering neighbor cells of a cell served by a controller in an operator network, which permits to dispatch frequencies to mobiles connected to the cell for ANR measurements.

To this end, there is provided a method for discovering neighbor cells in a radio cellular network comprising cells, each controlled by a controller, the method comprising, with respect to a controller controlling a cell:
  (a): selecting a frequency in a frequency list, each frequency being associated with a priority, a target value and a counter, and wherein said frequency is selected in the frequency list according to its priority;
  (b): selecting a terminal located in the cell and connected with the controller;
  (c): sending a control message to the selected terminal, said control message comprising a request to perform radio measurements relating to neighbor cells of the cell, for the selected frequency.
  (d): incrementing the counter associated with the frequency;
  (e): if the counter is equal to the target value for the selected frequency, then deleting the selected frequency from the frequency list;
  repeating steps (a), (b), (c), (d) and (e) during a predetermined time or until the frequency list if empty.

According to not limited embodiments, the method can comprise one or more of the following additional characteristics:
  the selected frequency is the one that has the highest priority. Then, some neighbor cells can be discovered uppermost.
  the selected terminal is a newly connected terminal with the controller. Indeed, configuration is more convenient to realize at the beginning of a connection. Besides, neighbor cells are more easily discoverable by a newly connected terminal, which has chances to be located at the cell edge.
  the selected terminal is an already connected terminal with the controller. Then, the terminals resource is optimized because every terminal is liable to be used.
  supplementary steps are:
    selecting all terminals connected with the controller;
    sending a control message to the selected terminal, said control message comprising a request to perform radio measurements relating to neighbor cells of the cell, for the selected frequency.
  a supplementary step is resetting counters after the predetermined time. Then the method can be carried out again until no more unknown neighbor relations are discovered.
  the neighbor cell is a LTE cell or a cell from another radio technology. Indeed, terminals are able to discover neighbor cells from the same technology as the cell, or neighbor cells from another technology.

In addition, there is provided a controller in radio cellular network comprising cells, said controller controlling a cell and comprising:
  selection means for selecting a terminal connected with the controller;
  configuration means for sending a control message to the selected terminal, said control message comprising a request to perform radio measurements relating to neighbor cells of the cell, for a selected frequency, said frequency being associated with a priority, a target value and a counter;

incrementing means for incrementing the counter associated with the frequency;

comparison means for comparing the counter with the target value associated with the frequency.

In addition, there is provided a computer program product for a computer, comprising a set of instructions, which when loaded into said computer, causes the computer to carry out the method according to any one of the previous characteristics.

BRIEF DESCRIPTION OF THE DRAWINGS

Some embodiments of apparatus and/or methods in accordance with embodiments of the present invention are now described, by way of example only, and with reference to the accompanying drawings, in which.

DESCRIPTION OF EMBODIMENTS

In the following description, well-known functions or constructions by the man skilled in the art are not described in detail since they would obscure the invention in unnecessary detail.

Figure 1:
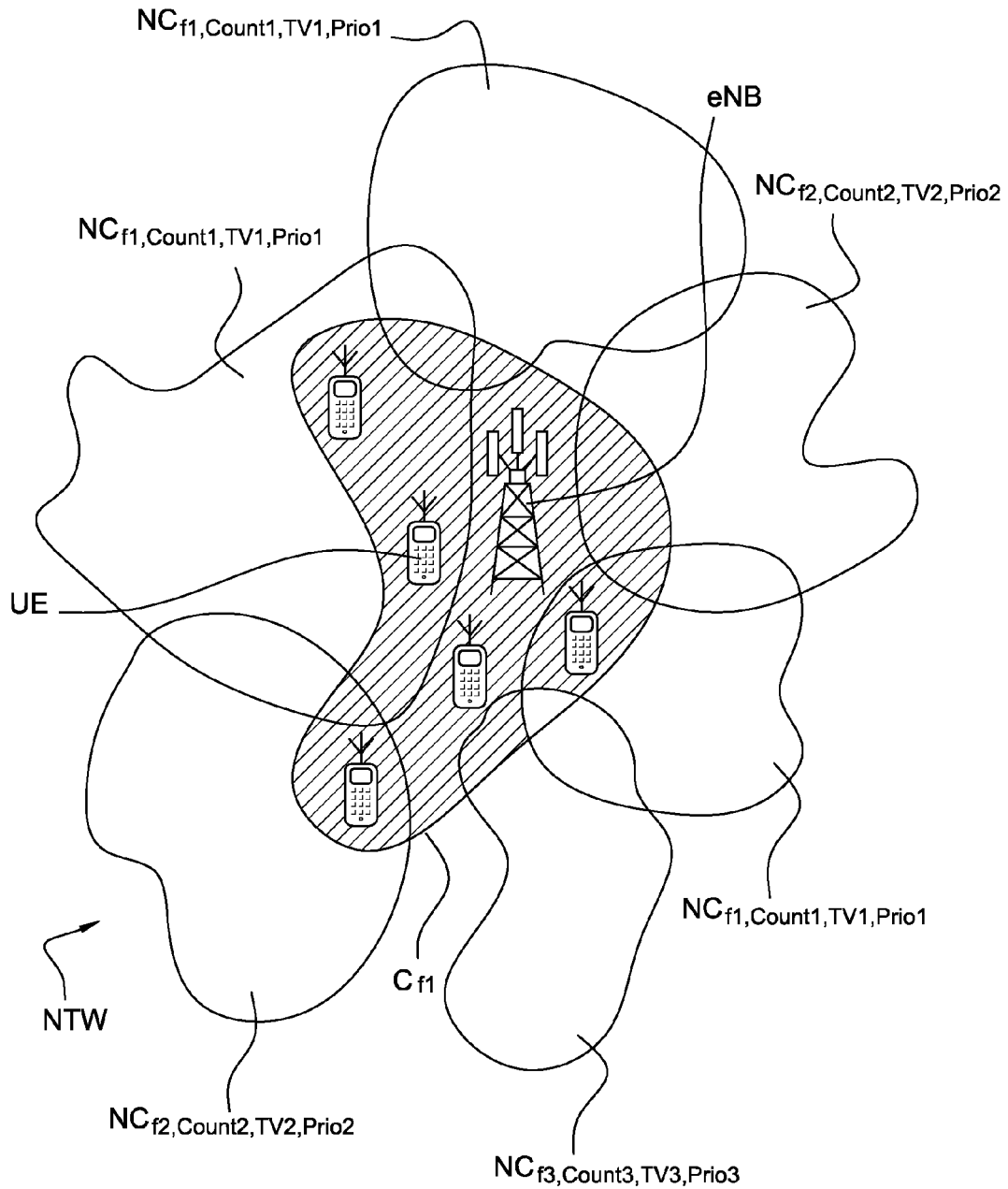
FIG. 1 schematically illustrates a not limited embodiment of a network in which the method in accordance with the present invention is carried out.

The present invention relates to a method carried out in a radio cellular network NTW, as represented in FIG. 1. The method is used for discovering neighbor cells NC of a cell C served by a controller eNB. Some neighbor cells NC can be from the same radio technology than the cell C, for example LTE cells, and some neighbor cells NC can be from another radio technology, for example 2G, 3G or CDMA2000 cells.

Terminals located in the cell C can connect with the controller eNB in establishing calls with the cell C or in migrating from a neighbor cell NC to the cell C during an already established call.

The controller eNB comprises:
selection means select_means for selecting a terminal UE located in the cell C and connected to the controller eNB;
configuration means config_means for configuring and unconfiguring terminals UE to perform Automatic Neighbor Relation ANR measurements;
reception means recept_means for receiving ANR measurement reports from terminals UE;
incrementing means increment_means for incrementing a counter (Count);
comparison means compare_means for comparing the counter (Count) with a value.

Each neighbor cell NC of the network NTW uses a determined frequency f. In a not limited example used in the following description, the cell C uses a frequency f1, and neighbor cells NC use frequencies f1 (the same as the one used by the cell C), f2 and f3.

Each frequency f is associated to a priority Prio. Priorities Prio of frequencies f are preconfigured by an operator of the network NTW, via an Operations and Maintenance (OAM) function, and define frequencies priority ranks for assignment: priorities Prio determines which neighbor cells NC are to be discovered first. Frequencies priorities are based on various criteria. For example, a frequency f might be dedicated to a service (voice call, streaming video, mail consultation . . . ), so the operator is able to give priority to a service on others.

In the following description, let frequencies f1, f2 and f3 be respectively associated to priorities Prio1, Prio2 and Prio3, and for example Prio1>Prio2>Prio3. As a consequence, in this not limited example, f1 is the frequency which has the highest priority.

A duration Tc is preconfigured by the operator, for example 15 seconds. The method starts at the beginning of the duration Tc, and as long as the duration Tc has not ended, the method comprises:

in a step 1 (function select illustrated in FIG. 2), the controller eNB selects a terminal UE, which will be configured for performing an ANR measurement. Candidates for selection are terminals UE newly connected with the controller eNB, that means terminals UE connected after the beginning of the duration Tc, and which have never been configured. Selection is realized via selection means select_means.

It is to be noted that selecting newly connected terminals UE has the following advantages:

As previously said, some terminals UE connect with the controller eNB in migrating from a neighbor cell NC during an already established call. As a consequence, these terminals are located at the cell C edge, which is a preferential location for detect neighbor cells NC. Indeed, some neighbor cells NC are difficult to discover, particularly neighbor cells NC at the cell C edge.

Configuration is more convenient to realize at the beginning of a connection, because the controller eNB can include configuration instructions in a message already used for managing mobility, said message being sent from the controller eNB to a newly connected terminal UE.

In a step 2 (function config), the controller eNB configures the selected terminal UE for ANR measurement on frequency f1, because it is the frequency having the higher priority. Configuring means that frequency f1 is assigned to the terminal UE for performing ANR measurements: the terminal UE has to detect and report neighbor cells NC using the assigned frequency f1. Configuration is realized via configuration means config_means, through a control message. It is to be noted that a terminal can detect a neighbor cell if it can receive its radio signal. Moreover, it is to be noted that measurements on the same frequency as the frequency used in the cell C are called intra-frequency measurements, and measurements on a different frequency from the frequency used in the cell C are called inter-frequency measurements.

The terminal UE performs ANR measurements on frequency f1: the terminal tries to discover neighbor cells NC using frequency f1.

Each frequency f is associated with a target value TV and a counter Count: f1, f2 and f3 are respectively associated with TV1, TV2, TV3, and with Count1, Count2 and Count3. The counter Count aims at counting the total number of terminals UE which are configured at least once with the specific frequency f. The target value TV represents the target value of the counter Count before the duration Tc ends, and is predefined by the operator, on the basis of the terminals traffic in the cell C: the higher the traffic is, the higher the traffic value TV can be high, because more terminals UE can be configured for performing ANR measurements.

in a step 3 (function increment), the controller eNB increments by 1 the counter Count1 associated with the frequency f1. Incrementation is realized via incrementation means increment_means.

In a step 4 (function recept), the controller eNB receives an ANR measurement report from the terminal UE, said report comprising PCIs/CGIs, Tracking Area Codes (TACs), and all available operator codes (PLMN IDs) of detected neighbor cells NC using the frequency f1. Reception is realized via reception means recept_means.

In a step 5 (function unconfig), after reception of the ANR measurement report, the terminal UE is unconfigured for ANR measurements on frequency f1. Either the terminal UE unconfigures itself, either the controller unconfigures the terminal via configuration means config_means, through a control message.

In a step 6 (function compare), the controller eNB compares the counter Count1 with the associated target value TV1. Comparison is realized via comparison means compare_means.

Steps 1 to 6 are performed independently on other newly connected terminals UE which have never been configured, until the value of the counter Count1 turns equal to the target value TV1, or until the duration Tc ends.

If the value of the counter Count1 turns equal to the target value TV1 before the duration Tc ends, then steps 1 to 6 are performed with another frequency f: the frequency f2 which has the second higher priority Prio2. Then steps 1 to 6 are performed at the same time on newly connected terminals UE which have never been configured, in the same way than previously, until the value of the counter Count2 turns equal to the target value TV2, or until the duration Tc ends.

If the value of the counter Count2 turns equal to the target value TV2 before the duration Tc ends, then the loop continues in the same way with another frequency, until every frequency is processed or until the duration Tc ends.

If the duration Tc ends before the counter Count of the ongoing processing frequency f turns equal to the associated target value TV, then there were not enough terminals traffic in the cell C to discover neighbor cells NC for the predefined target value TV. In that case, the method comprises the following additional steps:

in a step 7 (function select), the controller eNB selects all the terminals UE already located in the cell C, connected to the controller eNB, and available to make new measurements. This selection aims at reconfiguring a maximum of available terminals for trying to reach quickly the target value TV. The terminals population is then optimized, because terminals are reused.

In a step 8 (function config), the controller eNB reconfigures these terminals UE for ANR measurements on frequency f.

In a step 9 (function increment), the controller eNB increments the counter Count by the number of configured terminals UE.

In a step 10 (function recept), the controller eNB receives ANR measurement reports from the terminals UE.

In a step 11 (function unconfig), the controller eNB unconfigures the terminals UE for ANR measurements on the frequency f.

In a step 12, the controller resets every counter Count associated with every frequency f.

It is to be noted that a long duration Tc implies long discovery time, and a short duration Tc implies high processing. Therefore the duration Tc should be a trade-off between the two cases.

FIGS. 2a to 2c and FIGS. 3a to 3c are graphs illustrating respectively a first use-case and a second use-case of the method in accordance with the present invention.

Let suppose:
frequencies considered for neighbor cells NC discovery: one intra-frequency intra_f0, and two inter-frequencies UTRA_f1 and UTRA_f2. Incoming terminals UE have radio capabilities to perform ANR measurements on these three frequencies.
intra_f0 priority>UTRA_f1 priority>UTRA_f2 priority
duration Tc=15 seconds
terminals traffic in the cell C: 10 incoming calls/second
mean call duration: 15 seconds
mean detection time for ANR measurement: 3 seconds
terminals UE configured for ANR measurements on the intra-frequency intra_f0 remain configured during 5 seconds, and then are unconfigured by the controller eNB.
terminals UE configured for ANR measurements on an inter-frequency UTRA_f1 or UTRA_f2, remain configured during the detection time (3 seconds), and then unconfigure themselves.

First Use-Case

Assumptions for the first-use case: intra_f0 Target Value (named TV_f0)=UTRA_f1 Target Value (named TV_f1)=UTRA_f2 Target Value (named TV_f2)=50 configured mobiles.

Figure 3A:
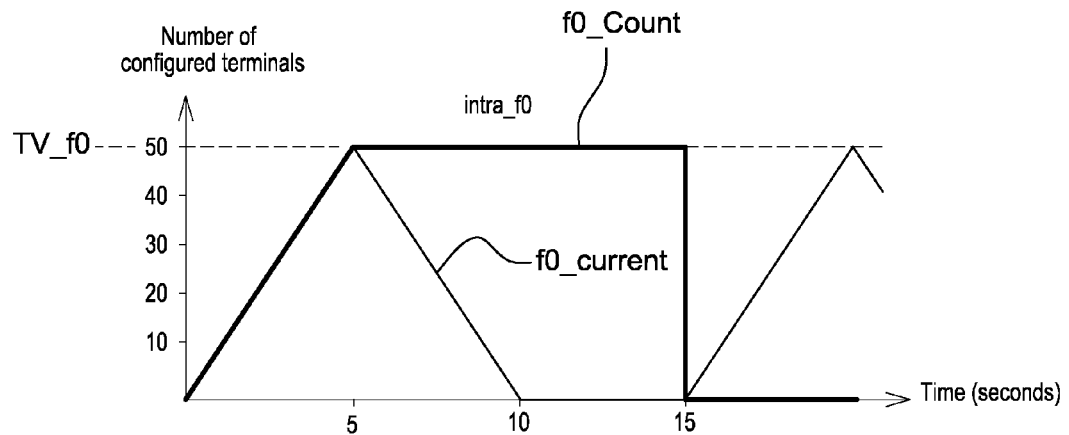
FIG. 3a is a graph of ANR measurement values realized at frequency f1, in a first not limited use-case of the method in accordance with the present invention.
Figure 3B:
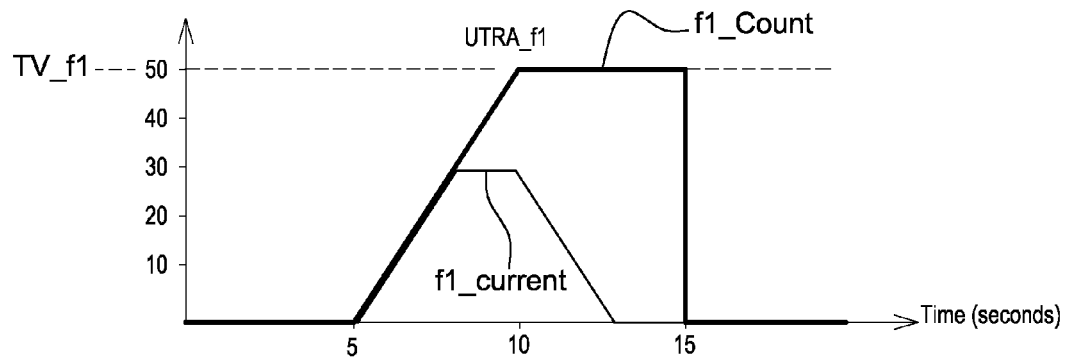
FIG. 3b is a graph of ANR measurement values realized at frequency f2, in the first use-case.
Figure 3C:
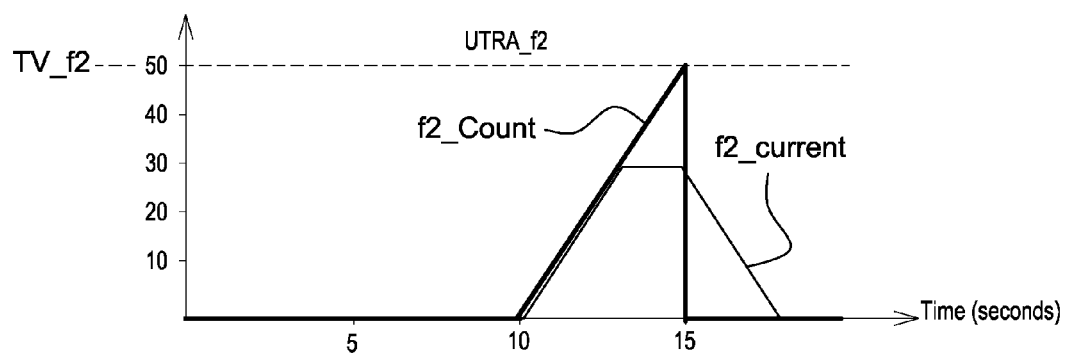
FIG. 3c is a graph of ANR measurement values realized at frequency f3, in the first use-case.

Graphs on FIGS. 3a, 3b and 3c represent:
in curves f0_Count, f1_Count and f2_Count, the values of the counters associated respectively with frequencies intra_f0, UTRA_f1 and UTRA_f2, which represent the total numbers of terminals UE which are or have been configured at least once on respectively frequencies intra_f0, UTRA_f1 and UTRA_f2.
in curves f0_current, f1_current and f2_current, the current numbers of terminals UE configured on respectively frequencies intra_f0, UTRA_f1 and UTRA_f2 (unconfigured terminals UE are subtracted).

From 0 to about 5 seconds: as represented by the curve f0_Count, the controller eNB assigns the 50 first incoming calls to the intra-frequency intra_f0 because it is the frequency which has the highest priority. Configuration processes as long as the counter Count_f0 associated to the frequency f0 is lower than the target value TV_f0.

From about 5 to about 10 seconds: as represented by the curve f1_Count, the controller eNB assigns the next 50 incoming calls to the inter-frequency UTRA_f1, because it is the frequency which has the second higher priority. Configuration is processed as long as the counter Count_f1 associated to the frequency f1 is lower than the target value TV_f1. We can notice that the curve f1_current stops increasing at 8 seconds (3 seconds after it starts increasing), because terminals UE configured for ANR measurements on inter-frequency UTRA_f1 remain configured during the detection time (3 seconds), and then unconfigure themselves. As a consequence, the number of new connected terminals UE compensate for the number of unconfigured terminals UE, that is why the curve f1_current turns constant.

From about 10 to about 15 seconds: as represented by the curve f2_Count, the controller eNB assigns the next 50 incoming calls to the inter-frequency UTRA_f2, because it is the frequency which has the third higher priority. Configuration is processed as long as the counter Count_f2 associated to the frequency f2 is lower than the target value TV_f2. We can notice that the curve f2_current stops increasing at 13 seconds (3 seconds after it starts increasing), because terminals UE configured for ANR measurements on inter-frequency UTRA_f2 remain configured during the detection time (3 seconds), and then unconfigure themselves. As a consequence, the number of new connected terminals UE compensate for the number of unconfigured terminals UE, that is why the curve f2_current turns constant.

At about 15 seconds (the value of the duration Tc): the controller checks whether Count_f2=TV_f2. It this example, that is the case, so the controller eNB resets every counter Count associated with every frequency. That is why the curves f0_Count, f1_Count and f2_Count go down to 0.

In conclusion, in this first use-case, the terminals UE traffic in the cell C was sufficient to perform every ANR measurements on the three frequencies, which is unsurprising because target values TV were exactly ⅓ of the terminals traffic.

Second Use-Case

Assumptions for the second-use case: TV_f0=TV_f1=TV_f2=100 configured mobiles.

Figure 4A:
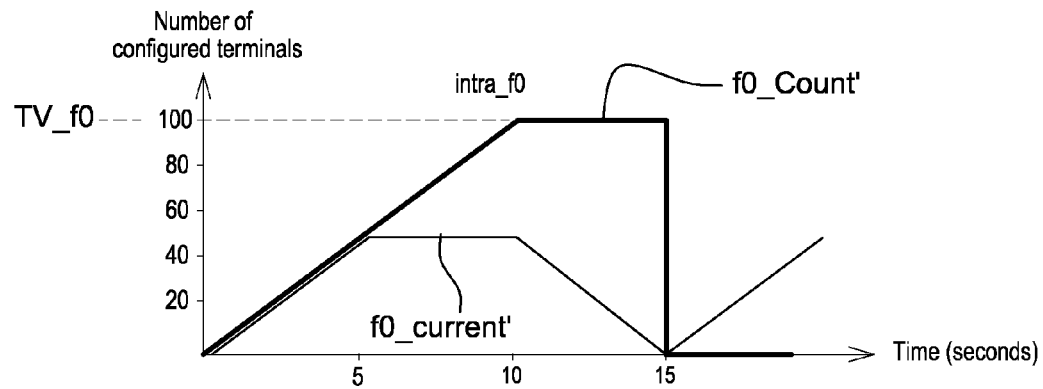
FIG. 4a is a graph of ANR measurement values realized at frequency f1, in a second not limited use-case of the method in accordance with the present invention.
Figure 4B:
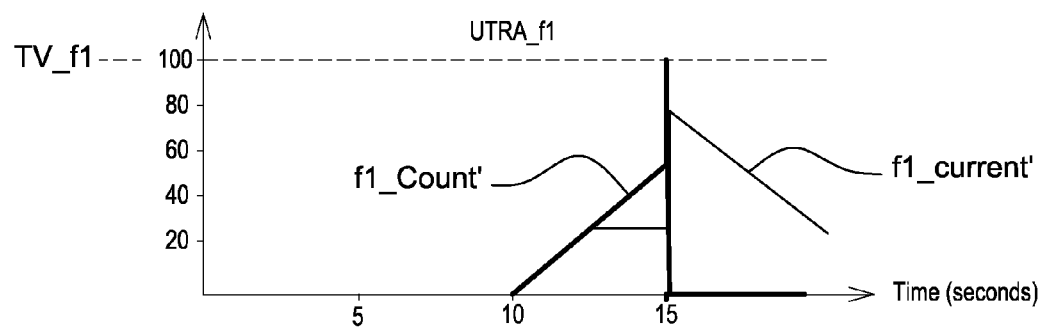
FIG. 4b is a graph of ANR measurement values realized at frequency f2, in the second use-case.
Figure 4C:
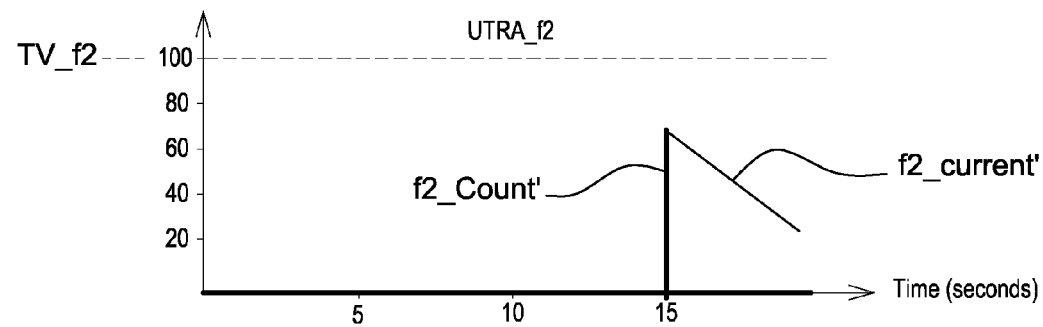
FIG. 4c is a graph of ANR measurement values realized at frequency f3, in the second use-case.

Graphs on FIGS. 4a, 4b and 4c represent:

in curves f0_Counf, f1_Count' and f2_Count', the values of the counters associated respectively with frequencies intra_f0, UTRA_f1 and UTRA_f2, which represent the total numbers of terminals UE which are or have been configured at least once on respectively frequencies intra_f0, UTRA_f1 and UTRA_f2.

in curves f0_current', f1_current' and f2_current', the current numbers of terminals UE configured on respectively frequencies intra_f0, UTRA_f1 and UTRA_f2 (unconfigured terminals UE are subtracted).

From 0 to about 10 seconds: as represented by the curve f0_Counf, the controller eNB assigns the 100 first incoming calls to the intra-frequency intra_f0 because it is the frequency which has the highest priority. Configuration is processed as long as the counter Count_f0 associated to the frequency f0 is lower than the target value TV_f0. We can notice that the curve f0_current' stops increasing at about 5 seconds, because terminals UE configured for ANR measurements on the intra-frequency intra_f0 remain configured during 5 seconds, and then are unconfigured. As a consequence, the number of new connected terminals UE compensate for the number of unconfigured terminals UE, that is why the curve f0_current' turns constant.

From about 10 to about 15 seconds: as represented by the curve f1_Count', the controller eNB assigns the next 50 incoming calls to the inter-frequency UTRA_f1, because it is the frequency which has the second higher priority. Configuration is processed as long as the counter Count_f1 associated to the frequency f1 is lower than the target value TV_f1. We can notice that the curve f1_current' stops increasing at about 13 seconds (3 seconds after it starts increasing), because terminals UE configured for ANR measurements on inter-frequency UTRA_f1 remain configured during the detection time (3 seconds), and then unconfigure themselves. As a consequence, the number of new connected terminals UE compensate for the number of unconfigured terminals UE, that is why the curve f1_current' turns constant.

At about 15 seconds (the value of the duration Tc): the controller eNB checks whether Count_f1=TV_f1. It this example, that is not the case, because Count_f1=50, so the controller eNB selects all the terminals UE already configured on any frequency and then unconfigured. It is calculated by subtracting the current number of terminals UE currently configured for ANR measurement from the total number of connected terminals UE: (calls throughput in the cell*mean call duration)−(f0_current+f1_current+f2_current)=(10 incoming calls/second*15 seconds)−(0+30+0)=120 terminals UE having terminated their ANR measurements and that are still connected.

The controller assigns 50 of theses terminals to the inter-frequency UTRA_f1 for ANR measurement (so Count_f1=TV_f1), and the last 70 terminals (120−50) to the inter-frequency UTRA_f2 for ANR measurement.

Then the controller eNB resets every counter Count associated with every frequency. That is why the curves f0_Count and f1_Count go down to 0.

It is to notice that no ANR measurements have been performed on frequency UTRA_f2. In conclusion, in this second use-case, the terminals UE traffic in the cell C was not sufficient to perform every ANR measurements on the three frequencies, which is unsurprising because target values TV were higher than ⅓ of the terminals traffic.

This invention permits to dispatch mobiles located in the cell C and connected to the controller eNB, for ANR measurements, in optimizing the terminal resource.

A person of skill in the art would readily recognize that steps of above-described methods can be performed by programmed computers. Herein, some embodiments are also intended to cover program products for a computer, comprising a set of instructions, which, when loaded into said computer, causes the computer to carry out above-described method. The program storage devices may be, e.g., digital memories, magnetic storage media such as a magnetic disks and magnetic taps, hard drives, or optically readable digital data storage media. The embodiments are also intended to cover computers programmed to perform said steps of the above-described method.

Figure 2:
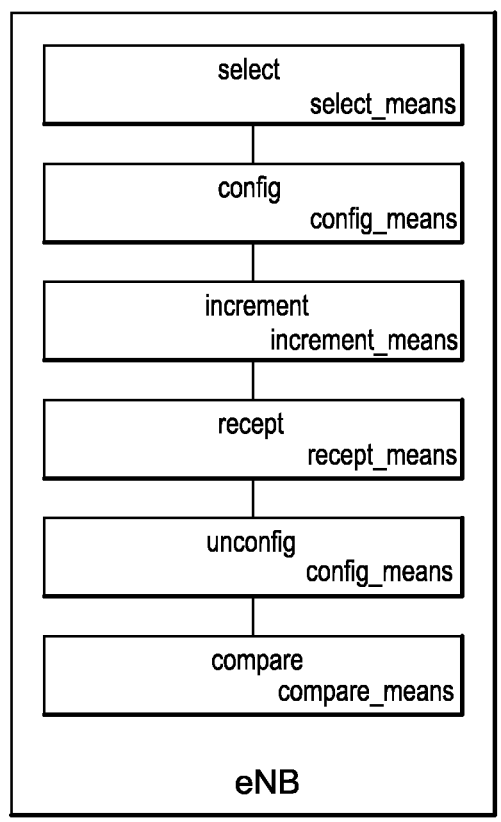
FIG. 2 is a functional diagram of a not limited embodiment of a method in accordance with the present invention.

In a not limited embodiment of FIG. 2 or FIG. 2b is, the controller eNB comprises a computer program product PG, said computer program product comprising a set of instructions. Thus, said set of instructions contained, for example, in the controller eNB programming memory, may cause the controller to carry out the different steps of the method. The set of instructions may be loaded into the programming memory by reading a data carrier such as, for example, a disk. A service provider can also make the set of instructions available via a communication network such as, for example, the Internet.

Of course, in another not limited embodiment, the controller may comprise a plurality of computer program products PG.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for discovering neighbor cells in a radio cellular network comprising cells, each controlled by a controller, the method comprising, with respect to a controller controlling a cell:
    selecting a frequency in a frequency list, each frequency being associated with a priority, a target value and a counter, and wherein said frequency is selected in the frequency list according to its priority;
    selecting a terminal located in the cell and connected with the controller;
    sending a control message to the selected terminal, said control message comprising a request to perform radio measurements relating to neighbor cells of the cell, for the selected frequency
    incrementing the counter associated with the frequency;
    if the counter is equal to the target value for the selected frequency, then deleting the selected frequency from the frequency list;
    repeating selecting a frequency, selecting a terminal, sending a control message, incrementing the counter and if the counter is equal to the target value for the selected frequency, then deleting the selected frequency from the frequency list during a predetermined time or until the frequency list is empty.

2. A method according to claim 1, wherein the selected frequency is the one that has the highest priority.

3. A method according to claim 1, wherein the selected terminal is a newly connected terminal with the controller.

4. A method according to claim 1, wherein the selected terminal is an already connected terminal with the controller.

5. A method according to claim 1, the method further including:
    selecting all terminals connected with the controller; and
    sending a control message to each selected terminal, said control message comprising a request to perform radio measurements relating to neighbor cells of the cell, for the selected frequency.

6. A method according to claim 1 the method further including resetting counters after the predetermined time.

7. A method according to claim 1, wherein the neighbor cell is a LTE cell or a cell from another radio technology.

8. Controller in a radio cellular network comprising cells, said controller controlling a cell and comprising:
    a processor configured to:
        select a terminal connected with the controller;
        send a control message to the selected terminal, said control message comprising a request to perform radio measurements relating to neighbor cells of the cell, for a selected frequency, said frequency being associated with a priority, a target value and a counter;
        increment the counter associated with the frequency;
        compare the counter with the target value associated with the frequency and if the counter is equal to the target value for the selected frequency, then deleting the selected frequency from the frequency list; and
        repeat selecting a terminal, sending a control message, incrementing the counter and if the counter is equal to the target value for the selected frequency, then deleting the selected frequency from the frequency list during a predetermined time or until the frequency list if empty.

9. A computer program product for a computer, comprising a program storage device having stored thereon a set of instructions, which when loaded into said computer, causes the computer to carry out the method according to claim 1.

* * * * *